US008719312B2

(12) United States Patent
Jin et al.

(10) Patent No.: US 8,719,312 B2
(45) Date of Patent: May 6, 2014

(54) INPUT/OUTPUT EFFICIENCY FOR ONLINE ANALYSIS PROCESSING IN A RELATIONAL DATABASE

(75) Inventors: Yi Jin, Beijing (CN); Lei Li, Beijing (CN); Li Li Wang, Beijing (CN); Wan Chuan Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 13/430,897

(22) Filed: Mar. 27, 2012

(65) Prior Publication Data

US 2012/0254252 A1 Oct. 4, 2012

(30) Foreign Application Priority Data

Mar. 31, 2011 (CN) .......................... 2011 1 0085681

(51) Int. Cl.
*G06F 7/00* (2006.01)
*G06F 17/30* (2006.01)
(52) U.S. Cl.
USPC ........................... 707/802; 707/803; 707/812
(58) Field of Classification Search
USPC .......... 707/600, 602, 790, 797, 802, 803, 812
See application file for complete search history.

(56) References Cited

U.S. PATENT DOCUMENTS

| 5,918,225 | A | 6/1999 | White et al. | |
|---|---|---|---|---|
| 6,366,902 | B1 * | 4/2002 | Lyle et al. | 707/782 |
| 7,099,325 | B1 * | 8/2006 | Kaniz et al. | 370/392 |
| 7,386,563 | B1 | 6/2008 | Pal | |
| 7,818,349 | B2 * | 10/2010 | Frost | 707/802 |
| 2009/0024654 | A1 * | 1/2009 | Zhao et al. | 707/103 R |
| 2009/0254532 | A1 | 10/2009 | Yang et al. | |
| 2010/0011031 | A1 | 1/2010 | Huang et al. | |
| 2010/0030728 | A1 | 2/2010 | Chakkappen et al. | |
| 2010/0164972 | A1 * | 7/2010 | Akerib et al. | 345/560 |
| 2010/0235335 | A1 | 9/2010 | Heman et al. | |
| 2011/0029569 | A1 * | 2/2011 | Ganesh et al. | 707/796 |
| 2011/0246432 | A1 * | 10/2011 | Yang et al. | 707/693 |
| 2011/0264667 | A1 * | 10/2011 | Harizopoulos et al. | 707/743 |
| 2012/0011144 | A1 * | 1/2012 | Transier et al. | 707/769 |

OTHER PUBLICATIONS

Chang, F. et al., "Bigtable: A Distributed Storage System for Structured Data", OSDI 2006 pp. 14.
"Data Warehouse in the Enterprise", SQL Server Technical Article, Jan. 2008, pp. 1-11.
Burelson Consulting, "Oracle column level compression", IT Tips by Burelson Consulting, Sep. 5, 2009, www.dba-oracle.com/t_11g_r2_column_level_compression.html.
Abadi, Daniel, "DBMS Musings: Distinguishing Two Major Types of Column Stores" http://dbmsmusings.blogspot.com/2010/03/distinguishing-two-major-types-of_29.html, Dec. 13, 2012, p. 1-20.

* cited by examiner

*Primary Examiner* — Hares Jami
(74) *Attorney, Agent, or Firm* — Cantor Colburn LLP; Farrokh Pourmirzaie

(57) ABSTRACT

Embodiments of the invention relate to improved input/output efficiency for online analysis processing in a relational database. An aspect of the invention includes selecting a table from a relational database. The table is split by column into sub-tables, with at least one of the sub-tables including at least two columns. Each sub-table is written into a corresponding table of a row-based storage database.

9 Claims, 5 Drawing Sheets

INPUT/OUTPUT EFFICIENCY FOR ONLINE ANALYSIS PROCESSING IN A RELATIONAL DATABASE

PRIORITY

The present application claims priority to Chinese Patent Application No. 201110085681.2, filed Mar. 31, 2011, and all the benefits accruing therefrom under 35 U.S.C. §119, the contents of which is incorporated by reference herein in its entirety

BACKGROUND

The present invention relates generally to relational database technology, and more specifically, to improved input/output (I/O) efficiency for online analysis processing in a relational database.

A relational database management system (RDBMS) or "relational model" was introduced in the 1970s as a system for enabling interaction of data in various tables through formal algebraic and descriptive query language using structured query language (SQL).

In general, data is stored in a RDBMS in tables in accordance with a relationship storage model. The data is stored in the table as a set of sequences of rows in a data storage mechanism (for example, a disk, a main memory, other memories, etc.). In some systems an index is created as an additional data structure, which enables rapid access to data in specific row(s).

A SQL query is used in two categories of database interactive applications: an OLTP (Online Transaction Process) and an OLAP (Online Analysis Process). An OLTP application deals with online transaction processes and adopts a traditional row-stored solution. Information related to an OLTP transaction may be effectively added to, or retrieved from, a single table of a relational database. In the case of the OLAP, using small databases with simple relationships, a request of the OLAP application for the information can be responded to with reasonable efficiency using the row-based storage scheme. However, in the more complicated case of a query of a multi-dimensional database in an OLAP application that involves the search of only a few columns in a table consisting of many rows, and retrieval of aggregated data from those rows, if a row-based storage scheme is still used, then each of the tables is scanned across all dimensions, even those for which no scan is required, resulting in low I/O efficiency of the row-based storage scheme in the OLAP application.

SUMMARY

Embodiments include a method, data processing device, and computer program product for improved input/output efficiency for online analysis processing in a relational database. A table is selected from the relational database. The table is split by column into sub-tables, with at least one sub-table including at least two columns. The sub-tables are written to a row-based storage database.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The objects, features and advantages of the invention will become more apparent from the following description of embodiments of the invention in reference to the drawings. In the drawings, identical or corresponding technical features or components will be denoted with identical or corresponding reference signs.

DETAILED DESCRIPTION

Figure 1:
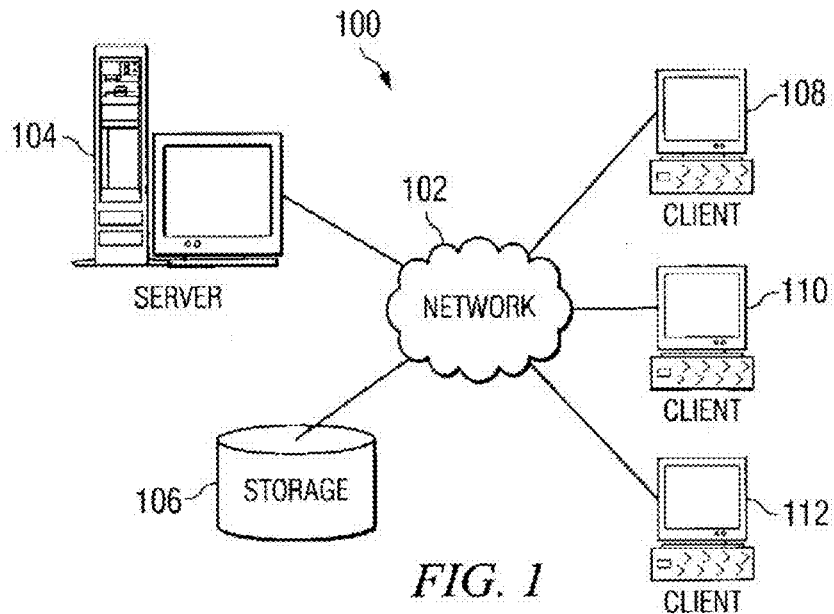
FIG. 1 is a schematic diagram illustrating a data processing system in an embodiment.

Embodiments are described below in reference to the drawings. It shall be noted that illustrations and descriptions of components and processes that are known to those of ordinary skill in the art have been omitted in the drawings and the description for the sake of clarity.

Compared with a traditional row-based storage model, such as an N array storage model (NSM), an embodiment integrates the characteristics of row-based storage and column-based storage and may be implemented within a row-based database management system (DBMS) (e.g., IBM DB2®). In embodiments, input/output (I/O) efficiency in online application processing (OLAP) is improved by providing a better workload by making changes at the compilation and execution level of traditional row-based storage model.

In an embodiment, when an aggregate needs to be computed over many rows but only for a subset of all columns, the OLAP will only read within the subset of columns, thereby saving I/O workload. In addition, by improving the cache hit ratio, memory pages are consumed more efficiently, and therefore a more efficient use of system memory is achieved. Furthermore, a higher compression ratio is achieved by embodiments for data that is only partially clustered at the column level or for a group of columns.

System Architecture

FIG. 1 is a schematic diagram illustrating a data processing system in accordance with an embodiment. A data processing system 100 includes a network 102 which provides a communication link between different devices and computers connected together in the data processing system 100.

In the illustrated example, a server 104 and a memory 106 are connected together over the network 102. Furthermore, client computers 108, 110, and 112 are also connected to the network 102. The client computers 108, 110, and 112 include computer processing systems which may include, but are not limited to a workstation, a personal computer, a mobile phone, and a personal digital assistant (PDA). In an embodiment, the server 104 provides client computers 108, 110, and 112 with data including a boot file, an operating system and/or a software application. The data processing system 100 may include additional servers, clients and other devices which are not illustrated. In FIG. 1, the data processing system 100 is interconnected over the Internet, and the network 102 is an aggregate representing networks and gateways that use the TCP/IP protocol suite to communicate with each other. The distributed data processing system 100 may alternatively be embodied as interconnected over different types of networks.

The system illustrated in FIG. 1 may be modified in various ways without departing from the spirit and scope of the various embodiments.

An embodiment includes a data processing system (e.g., a DBMS) executing on the server 104 as illustrated in FIG. 1. The data processing system may be a symmetric multi-processor (SMP) system comprising a plurality of processors connected to a system bus. Alternatively, a single-processor system may be used. Additional embodiments include a data processing system (e.g., a DBMS) executing on one or more of the client computers 108, 110, and 112 in FIG. 1.

Storage Model

Figure 2:
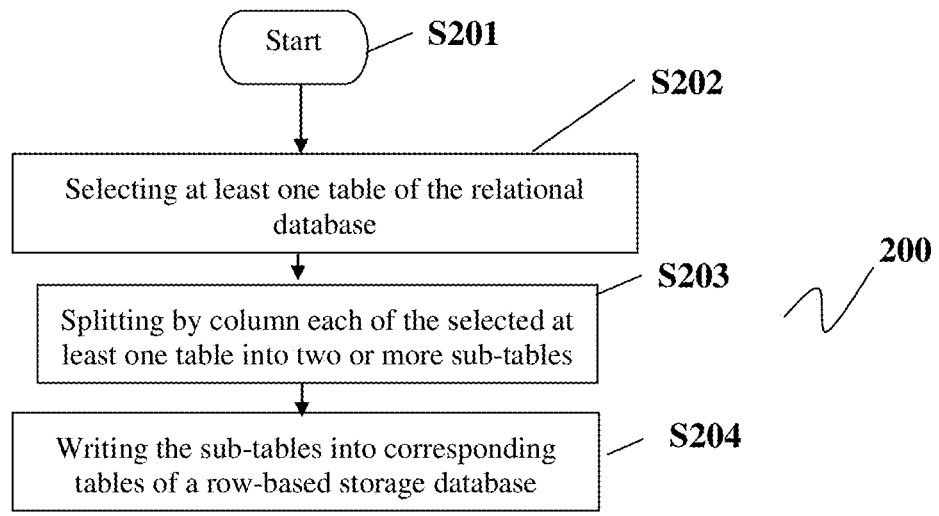
FIG. 2 depicts a flow chart of a method for improving the input/output (I/O) efficiency of online analysis processing (OLAP) in an embodiment.

As illustrated in FIG. 2, a data processing method 200 for a relational database according to an embodiment starts with block S201. At block S202, one or more tables of the relational database are selected. At block S203, each of the one or more tables of the relational database is split vertically by column into two or more sub-tables, where at least one of the sub-tables includes at least two columns. At block S204, the sub-tables are written into corresponding tables of a row-based storage database.

A relational database may include a plurality of tables, and in an embodiment, one or more of the tables may be selected and split respectively. In an alternate embodiment, all the tables of the relational database may be split. For the sake of simplicity, as illustrated in FIG. 3, only one table, T, in the relational database is split by column (i.e., vertically) into three sub-tables (T1, T2 and T3), which respectively have one column {C1}, two columns {C2, C3} and three columns {C4, C5, C6} to save the content of (c1), (c2, c3) and (c4, c5, c6) respectively.

Figure 3:
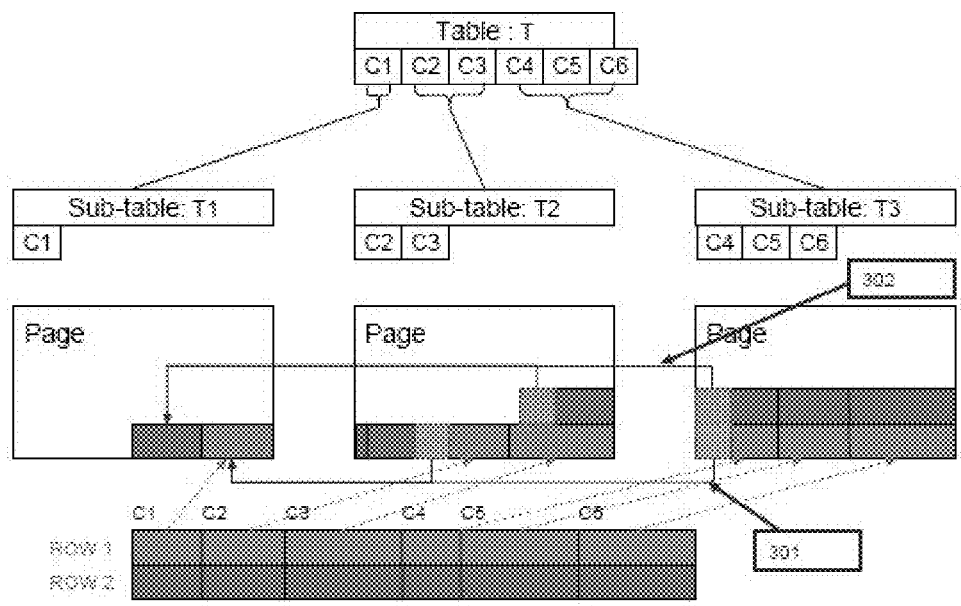
FIG. 3 is a schematic diagram of a storage model in an embodiment.

Then, the sub-tables T1, T2 and T3 are written respectively into three corresponding tables of a row-based storage database in the way of a row-based storage model (as illustrated in FIG. 3, three pages are used to save three sub-tables), that is, each of the sub-tables adopts a traditional row-based storage model. Thus, the content of every row in table T is separated by sub-tables and respectively saved in T1, T2 and T3. In a DBMS process, the DBMS may load only the required sub-table T1 instead of the whole table T, thereby achieving advantages similar to column-based storage DBMS and improving I/O efficiency.

In an embodiment, a user creates a table using a data definition language (DDL) statement that defines sub-tables via an option clause of a "create table" DDL command. In an embodiment, this is performed by the following DDL statement:

---

CREATE TABLE T (
    c1 INTEGER NOT NULL,
    c2 CHAR(10),
    c3 VARCHAR(1024),
    c4 DECIMAL NOT NULL,
    c5 VARCHAR(1024),
    c6 VARCHAR(1024) )
    COLUMN GROUPED BY (MAIN T1(c1), T2(c2,c3),T3(c4,c5,c6))

---

As illustrated in FIG. 3, the table T is a column based tabled which is divided into 3 sub-tables. In an embodiment, data in T1 is generated by the following:
    CREATE TABLE T1(c1 INTEGER NOT NULL)
In addition, data objects of (c2, c3) and (c4, c5, c6) are used to created sub-tables T2 and T3 as follows:

---

CREATE TABLE T2(c2 CHAR(10), c3 VARCHAR(1024));
CREATE TABLE T3(c4 DECIMAL NOT NULL,
        c5 VARCHAR(1024), c6 VARCHAR1024) );

---

The table T may be split in any other type of subdivision. For example, the table T may or may not be a column grouped into two or more sub-tables. No matter how the table is split, it is possible for the DBMS to load/fetch only the required sub-tables for a query instead of searching the whole table T1. This provides an advantage over the traditional row-based storage model by increasing the I/O throughput.

In an embodiment, there are one or more identity columns (i.e., primary keys, and/or foreign keys) in each table of the relational database in order to facilitate joining the tables to each other to support different OLAP queries. This will facilitate various database schemas, such as the star/snowflake schema. During join operations, only these identity columns are necessary, therefore the identity columns are placed in one group, i.e. one sub-table. Then, the DBMS need only choose one sub-table for the joining operation.

In an embodiment, one column is selected in each of the selected tables, and then grouped together with the other columns according to the frequency that the selected column and the other columns are jointly accessed. This forms corresponding sub-tables, which creates a grouped sub-table with better I/O efficiency. Using a predetermined access frequency, the selected first column may be directly grouped together with other columns that have achieved the predetermined access frequency. The remaining columns may be directly grouped as another sub-table or further grouped in the same way as described above. In an alternate embodiment, the optimal sub-table grouping solution may also be obtained in accordance with the following calculation method.

For example, assume that the table includes columns $\{c_1, c_2, \ldots, c_n\}$. The queries on this table are $\{Q_1, Q_2, \ldots, Q_m\}$. For each query a sub-table composed of column $C_i$ is required. In an embodiment, the occurrence of each query $Q_i$ is assigned a probability $P_i$. A sub-table solution S is proposed, and based on S for the query the required sub-tables are chosen. Then the joining operation (J) counts for each $J_i$ and the number of unneeded columns (U) in the required sub-tables can then be determined. Each query is then looped, and an aggregated estimation of the impact of additional joining operation J and useless columns $U_i$ is determined, i.e.:

$$J = \sum_{i=1}^{m} J_i P_i, \quad U = \sum_{i=1}^{m} U_i P_i$$

S is then adjusted, and the process is repeated until an S is found that makes J and U small enough, that the optimal sub-table scheme S is obtained.

Row Reconstruction

As described above, each of the grouped sub-tables adopts a traditional row-based storage model. Therefore, queries and other ordinary operations on each sub-table may be performed in the same manner as a normal table of a row-based storage database. In an embodiment, an index is created for each sub-table, as an additional data structure, in order to further expedite a query.

In an embodiment, as the content of each row in the table is split into sub-tables and saved as corresponding rows thereof, the rows are reconstructed in the different sub-tables as described in more detail below. The following embodiments may also be used to facilitate queries and other operations on each sub-table.

In an embodiment, a row identifier (RID) value is added to corresponding rows in each of the sub-tables when each sub-table is written as a table of a row-based storage database that is saved in a storage device. Thus, data objects of the same rows in different sub-tables may be associated by the same RID value.

In an alternate embodiment, any of the sub-tables may be specified as a base sub-table, and RIDs of related rows of the base sub-table are added as RID values to all the other sub-tables as RIDs of their corresponding rows.

As illustrated in FIG. 3, T1 is specified as the base sub-table, and sub-tables T2 and T3 implicitly include a RID column (the reference signs 301 and 302 in FIG. 3 respectively represent the RID columns pointing to the first row and the second row) to save the RID value of T1 to maintain the horizontal relationship for each row. In an embodiment, a user may insert data by executing the following SQL:

```
INSERT INTO T VALUES( 1, 'name','This is a test', 123.90,
   'Test value',NULL);
INSERT INTO T VALUES( 1, 'name','This is a test', 123.90,
   'Test value',NULL);
```

The data will be inserted, by an embodiment, using the following SQL:
INSERT INTO T1 VALUES(1);
Assuming that the RID of this record is 1200, then the following SQL may be executed:

```
       INSERT INTO T2 VALUES(1200, 'name', 'This is a test');
//RID is implicitly inserted
       INSERT INTO T3 VALUES(1200, 123.90, 'Test value',
NULL);// RID is implicitly inserted
```

Like the first embodiment, the second embodiment is also provided to construct a RID for sub-tables, and then from this RID value, the DBMS may also choose a merge join operation to reconstruct the row content. In both the first and second embodiments, the DBMS may load or modify the content of the required sub-tables and perform a merge join operation without the support of an index, thereby achieving a row reconstruction more rapidly than by using an index. Each of the sub-tables is internally maintained as a common table, thus requiring only a small code change on a traditional row-based DBMS.

A further embodiment includes creating a general index for each sub-table by extending the structure of an index leaf of an RDBMS page to support a grouped storage model of sub-tables. A row pointer on the index leaf page is extended to a list of row pointers by using a B+ tree structure or hash index so that each of the leaf index entries has a row pointer for each row of the corresponding sub-tables, and so that the RID values of the row pointers of every leaf index entry respectively includes RIDs of corresponding rows in the corresponding sub-tables. This creates a general index for the table of the row-based database. This index supports row reconstruction and minimizes the cost of extension of an index at the same time.

In an embodiment, a user can create an index IDX by using the following DDL code:
CREATE INDEX IDX ON T(c1)

An index entry in a traditional B+ tree leaf page includes a key value (key) and a row pointer RID. The RID is a pair of (page number, slot number), and points to the row indexed on the disk.

For a row stored in N sub-tables, an array of RIDs is used in one-to-one correspondence to the Nth sub-table within the row as a list of row pointers to replace the RIDs in the original index entry. Taking the sub-tables illustrated in FIG. 3, for example, each of the leaf index entries consists of a key and row pointer RIDs, the number of which is the same as the number of sub-tables (i.e., three). This creates an array of row pointer RIDs as a list of pointers, and the group of row pointer RIDs of each index entry consists of RIDs of corresponding rows in the sub-table corresponding to the index entry.

Figure 4:
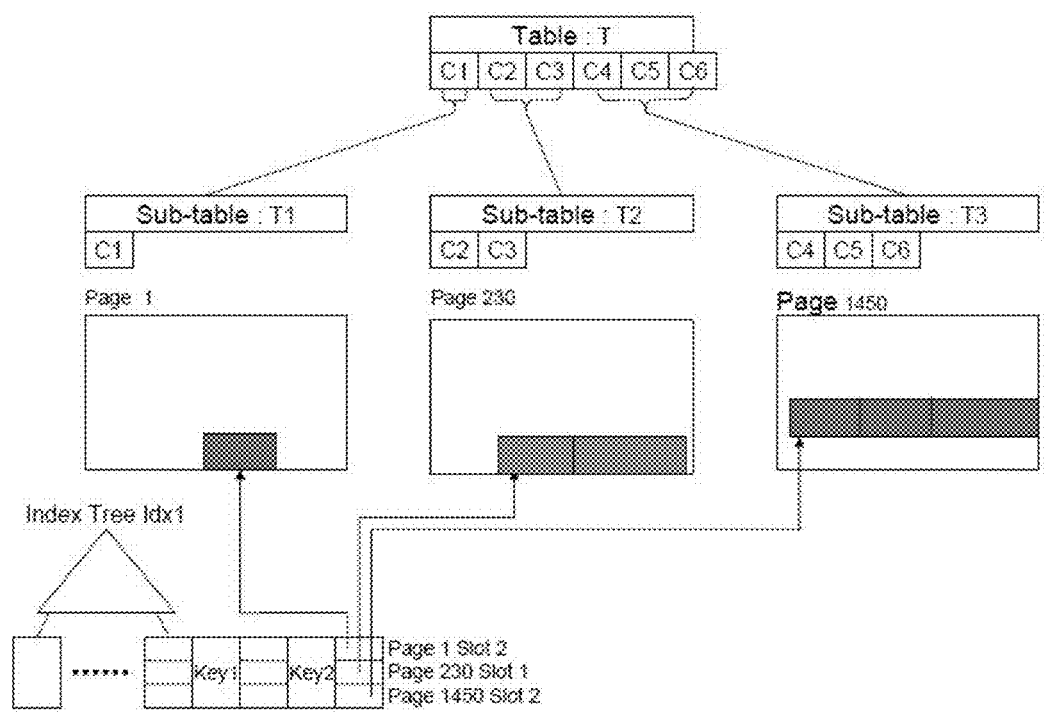
FIG. 4 is a schematic diagram of a storage model in an additional embodiment.

Therefore, the traditional B+ tree index and/or hash index may be adapted to index rows stored in the list in accordance with an embodiment where row reconstruction has been realized. By setting an index over the whole table, the DBMS locates related pages and records by examining the corresponding index entry. In particular, as shown in the embodiment of the index tree IDX1 in FIG. 4, three RIDs that Key2 corresponds to are respectively (Page 1, Slot 2), (Page 230, Slot 1) and (Page 1450, Slot 2), which means that these RIDs point to the corresponding row of the second record in page 1, the corresponding row of the first record in page 230 and the corresponding row of the second record in page 1450 respectively, thus facilitating the reconstruction of the row by extending the index leaf page structure.

Data Processing Device

Figure 5:
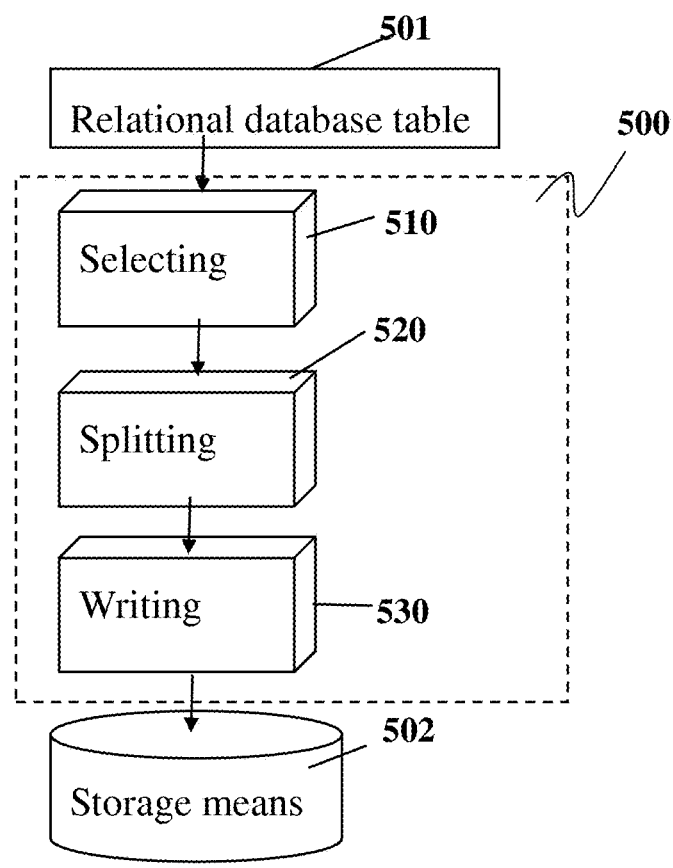
FIG. 5 is a schematic diagram of a data processing device for a relational database as a part of a database management system in an embodiment.

FIG. 5 is a schematic diagram of an embodiment of a data processing device for a relational database as a part of a DBMS. As shown in FIG. 5, a data processing device 500 for a relational database is part of the DBMS, which includes a selecting means 510 configured to select at least one table 501 of the relational database. The data processing system 500 further includes a splitting means 520 configured to vertically split each of the at least one table into two or more sub-tables at least one of which includes at least two columns. The data processing system 500 also includes a writing means 530 configured to write said sub-tables respectively into corresponding tables of a row-based storage database and save them into a storage means 502. The selecting means 510, as described above, may select any number of tables of a relational database.

The splitting means 520 splits the table as described above. In an embodiment, one column is selected in each of the selected table(s), and then grouped together with the other columns into sub-tables according to the frequency that the selected column and the other columns are jointly accessed.

In an embodiment, the writing means 530 creates RIDs for corresponding rows in said sub-tables, as described above by, for example, adding the same RID value to each of the corresponding rows so as to be written into the corresponding tables of the row-based storage database, or specifying one of the sub-tables as base sub-table and adding the RIDs of related rows of the base sub-table as RID values for all of the other sub-tables so that corresponding rows of all the other sub-tables have the same RID value, thereby facilitating row reconstruction and other data manipulations of the DBMS.

In an additional embodiment, in order to realize row reconstruction and other data manipulations, the data processing device 500 further includes an index means (not shown) configured to index the tables of the row-based storage database by using B+ tree structure or a hash index, where each of the leaf index entries has a RID value of row pointers for each of as the sub-tables, and the RID value of the row pointer of every index entry includes RIDs of the rows in the sub-tables corresponding to the index entry. In an embodiment, the various means, as described in FIG. 5 include a computer processor.

DBMS's Processing of SQL Queries

Figure 6:
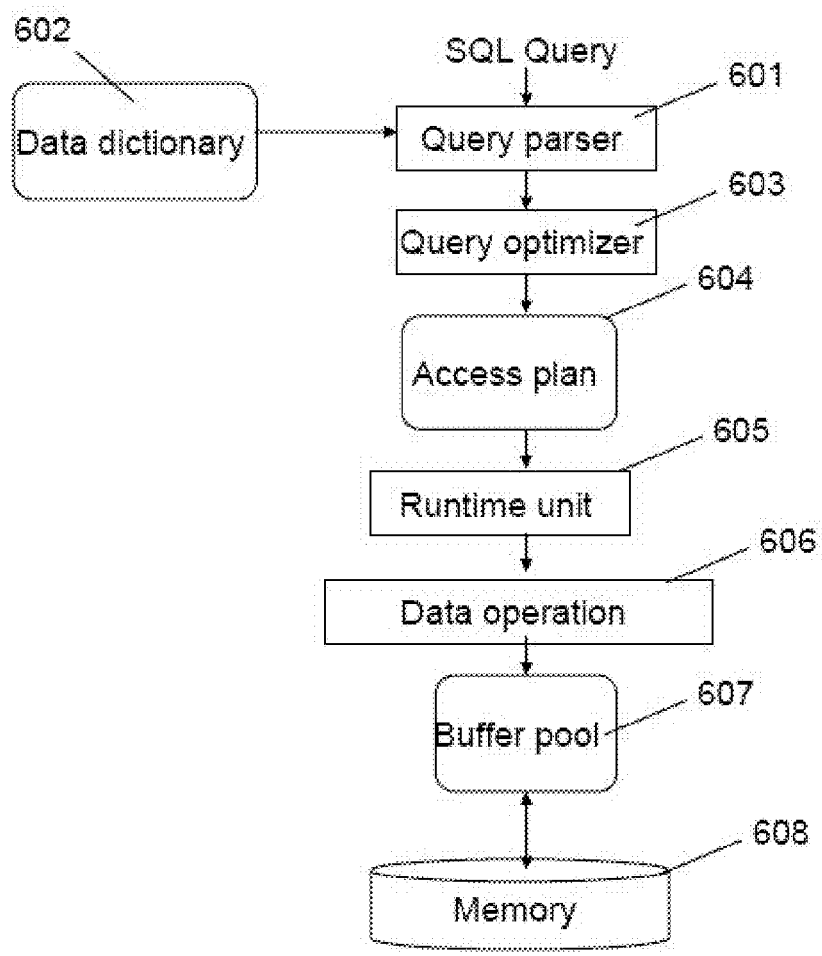
FIG. 6 depicts a schematic diagram for a system for implementing data query and data manipulation in a relational database in an embodiment.

FIG. 6 depicts a schematic diagram of a system for implementing data query and data manipulation in a relational database in accordance with an embodiment. As illustrated in FIG. 6, in response to a SQL query, the DBMS parses, optimizes and executes the SQL to generate a set of final results. A query parser 601 translates each SQL query into a series of SQL semantic descriptions by using information in a data dictionary 602. In response to a SQL query, the information from the query parser 601 and the data dictionary 602, a query optimizer 603 generates a set of possible access plans and selects therefrom a sufficiently efficient access plan 604 based on access plan execution cost estimations (i.e., amount of time, or processing cycles required to execute the query). A runtime unit 605 performs a read/write process (i.e., a data operation 606) in a buffer pool 607 according to the access plan 604, in order to generate a set of results.

The data dictionary 602 typically includes definitions of data elements and represented metadata. In the context of the DBMS, the data dictionary 602 contains the aggregate metadata of tables and views in the DBMS, and maintains information related to the definitions of the data elements, usernames, rows and privileges, mode objects, storage processes, a general database structure, as well as the space allocation. In an embodiment, the data dictionary 602 includes an aggregate of the table entries, where each table entry includes an aggregate of attributes or definitions of fields, and has a record of grouping/splitting information of sub-tables of the target database table. The query parser 601 changes the received SQL query into a new query against the sub-tables based upon such grouping/splitting information of the sub-tables data dictionary 602. Therefore, any unneeded columns are not accessed based on the selected access plan 604. Then, based on the grouping/splitting information of the sub-tables, the query optimizer 603 rewrites and generates a highly efficient access plan by using the sub-tables, thereby producing an optimized query.

In particular, using the sub-table grouped/split storage model according to an embodiment, the DBMS may choose to load different sub-tables of the same table respectively into memory at different stages of an access plan. For example, in a multi-table join operation that often occurs in an OLAP query, the columns of a table for the joining operation are loaded are loaded first for use with joining with other tables in an access plan. When the complex joining operations are finished, the other columns of the same table are loaded for a second stage of processing (e.g. computing aggregates) which does not require carrying additional columns across the queries and all query operations in traditional row-based storage model, therefore creating a more efficient access plan.

Aggregation Query

An aggregation operation for a LINEITEM table is described further herein in accordance with an embodiment. The LINEITEM table has 15 columns:

```
CREATE TABLE LINEITEM (
    L_ORDERKEY          INTEGER NOT NULL,
    L_PARTKEY           INTEGER NOT NULL,
    L_SUPPKEY           INTEGER NOT NULL,
    L_LINENUMBER        INTEGER NOT NULL,
    L_QUANTITY          DECIMAL(10,2),
    L_EXTENDEDPRICE     DECIMAL(10,2),
    L_DISCOUNT          DECIMAL(10,2),
    L_RETURNFLAG        CHAR(1),
    L_LINESTATUS        CHAR(1),
    L_SHIPDATE          DATE,
    L_COMMITDATE        DATE,
    L_RECEIPTDATE       DATE,
    L_SHIPINSTRUCT      CHAR(25),
    L_SHIPMODE          CHAR(10),
    L_COMMENT           VARCHAR(44),
    PRIMARY KEY (L_ORDERKEY, L_LINENUMBER) );
SELECT SUM(L_EXTENDEPRICE * L_DISCOUNT) AS REVENUE
FROM LINEITEM
WHERE L_SHIPDATE >= [date value]
AND L_SHIPDATE < [date value] + interval 1 year
AND L_DISCOUNT BETWEEN [discount] – 0.01 AND [discount]+0.01
AND L_QUANTITY < [quantity];
(values between the [ ] represents a constant)
```

Because there is no equivalent predicate in the WHERE clause, the DBMS will choose to table scan the entire table to select the rows that satisfy the query. In a traditional row-based DBMS, the entire 15 columns of the row have to be read from disk. In a column-based DBMS, only the 5 columns in the query (i.e., L_SHIPDATE, L_DISCOUNT, L_QUANTITY, L_EXTENDEPRICE, and L_DISCOUNT) are read/content loaded for this query.

By using the sub-table grouped/split storage model, if {L_QUANTITY, L_EXTENDEPRICE, L_DISCOUNT} is grouped as sub-table 1, and {L_SHIPDATE, L_SHIPINSTRUCT, L_SHIPMODE} is grouped as sub-table 2, then in accordance with embodiments, the DBMS will only load these 2 sub-tables including 6 columns.

If the RID is 8-bytes long, the integer value is 4-bytes long, the decimal value is 12-bytes long, and the date value is 6-bytes long, then the row length of table LINEITEM is 159 bytes. If the page size is 8 KB, and the table contains 100,000 rows, the table is saved in 1941 pages. To complete the query, the traditional row-based DBMS has to scan the whole 1941 pages.

If an embodiment of a sub-table grouped/split storage model is used, then sub-table 1, includes 3 columns. Assume that the length of a row in group one is 52 bytes, using the same 8 KB page size, and 100,000 rows, thus only about 635 pages are needed. Also, if the length of a row in sub-table 2 is 59 bytes, only 635 pages are needed to save the 100,000 rows. To complete the query, using the sub-table grouped/split storage model, the DBMS needs to completely scan only 1270 pages which is 65% of the I/O load of a traditional row-based DBMS. In an embodiment, the access plan for this execution is:

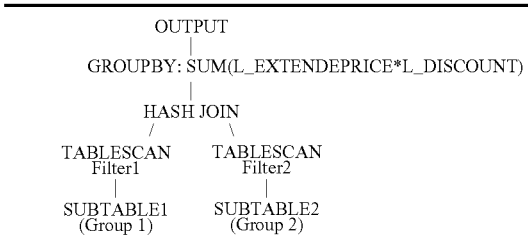

```
FILTER1: L_DISCOUNT BETWEEN [discount] −0.01 AND
[discount] +0.01 AND L_QUANTITY < [quantity]
FILTER2: L_SHIPDATE >= [date value] AND L_SHIPDATE < [date
value] + interval 1 year
```

In addition, if only the required 5 columns are grouped together in one sub-table, for this query, the I/O load will be 32% that of a traditional row-based DBMS. Thus, in an embodiment, through properly grouping/splitting the columns in a table the I/O load is reduced. For product systems, a big table with tens of columns is very common. The larger the quantity of columns in a table, the larger the improvement in I/O performance this sub-table grouped/split storage model will provide.

Other Advantageous Technical Effects

Improved Buffer Pool Hit Rate

If a table includes N rows, and M rows are buffered in memory, the probability p(R) of row R being chosen follows a uniform distribution, i.e. for any R p(R)=1/N. When a traditional row-based DBMS locates one row, the probability of the row being chosen is 1−M/N. This means as M is larger, i.e. more rows are buffered, and the probability of I/O occurrence is linearly reduced.

By comparison, in accordance with embodiments of the sub-table grouped/split storage model, the content of rows is divided into sub-tables. Because the length of a row in a sub-table is generally short, for a single page of sub-table, the quantity of rows is large. Thus, if the quantity of pages buffered in memory is constant, it is more likely for a DBMS to locate a row of one sub-table than from one common table, which directly reduces the I/O load by raising the buffer pool hit rate.

High Compression Ratio

In accordance with an embodiment of the sub-table grouped/split storage model, a sub-table may have fewer columns if, for example, the row values fall in a small value set. For example, the column GENDER can only be MALE or FEMALE. The DBMS can easily obtain a stable dictionary and achieve a high compression rate on the sub-table.

Easy to Implement in Row-Based DBMS

Embodiments of the sub-table grouped/split storage model can be achieved with only minor changes to a traditional row-based storage DBMS.

For example, in an embodiment, the sub-tables are treated as a common table saved in traditional row-based storage model. The operations and queries on a sub-table are the same as a common table.

Secondly, in order to achieve row reconstruction and/or expedited the creation of an index, the indices are only extended at the leaf nodes. The index method and algorithms need only minor changes.

In an alternate embodiment, the design for reconstructing a row uses only an implicit column which needs no special change on the storage of DBMS.

Those ordinarily skilled in the art can understand that all or any of the steps and components in the method and device according to the invention can be performed and implemented via hardware, firmware, software or a combination thereof in any computing device (including a processor, a storage medium, etc.) or network of computing devices, which can be fulfilled by those ordinarily skilled in the art making use of their general programming skills after reading the description of the invention, and therefore a detailed description thereof is omitted here.

Therefore, embodiments of the invention can further be attained by operating a piece of program or a set of pieces of program in any information processing device on the basis of the foregoing understanding. The information processing device could be a general-purpose device known to the public. Therefore, embodiments of the invention can also be attained by merely providing a program product that includes program codes to implement said method or device. In other words, both such a program product and a storage medium in which the program product is saved are also part of embodiments of the invention. Apparently, said storage medium can also be any storage medium known to the public or to be developed in future, and therefore, it is not necessary to enumerate various storage mediums one by one here. The program codes can be stored, for example, in a non-transitory computer readable storage medium.

Apparently, in the system and method according to embodiments of the invention, the respective components and steps can be decomposed and/or recombined. These decompositions and/or recombinations shall be regarded as solutions equivalent to the invention. Furthermore, the steps of performing the foregoing series of processes can be naturally performed in temporal sequence as described, but don't have to be performed in temporal sequence. Some of the steps can be performed concurrently or independently of each other.

The foregoing passages describe embodiments of the invention. Those ordinarily skilled in the art understand that the scope of the invention is not limited to the specific details as disclosed here, but may also include various variations and equivalent solutions without departing from the spirit and scope of the invention.

The invention claimed is:

1. A method comprising:
selecting a table of a relational database;
splitting, by a computer, the selected table by column into sub-tables, wherein at least one of the sub-tables includes at least two columns; and
writing each of the sub-tables into corresponding tables of a row-based storage database, the writing including:
specifying one of the sub-tables as a base sub-table;
creating a row identifier (RID) for each row in the base sub-table;
adding the RIDs to each row of the base sub-table; and
adding the RIDs to each corresponding row of each of the sub-tables.

2. The method of claim 1, wherein the splitting comprises:
selecting one column in the table; and
grouping the selected column together with other columns from the table according to a frequency that the selected column and the other columns are jointly accessed.

3. The method of claim 1, further comprising:
indexing each of the sub-tables of the row-based storage database by using one of:
a B+ tree structure; and
a hash index;
assigning a row pointer corresponding to each row of the sub-tables to each leaf index entry; and
setting a RID value of each of the row pointers of every index entry to the RID of each corresponding row in the sub-tables of the index entry.

4. A data processing device comprising:
a computer processor configured to perform a method comprising:
selecting a table of a relational database;
splitting the selected table by column into sub-tables, wherein at least one of the sub-tables includes at least two columns; and writing each of the sub-tables into corresponding tables of a row-based storage database, the writing including:
  specifying one of the sub-tables as a base sub-table;
  creating a row identifier (RID) for each row in the base sub-table;
  adding the RIDs to each row of the base sub-table; and
  adding the RIDs to each corresponding row of each of the sub-tables.

5. The data processing device of claim 4, wherein the splitting comprises:
  selecting one column in the table; and
  grouping the selected column together with other columns from the table according to a frequency that the selected column and the other columns are jointly accessed.

6. The data processing device of claim 4, wherein the method further comprises:
  indexing each of the sub-tables of the row-based storage database by using one of:
  a B+ tree structure; and
  a hash index;
  assigning a row pointer corresponding to each row of the sub-tables to each leaf index entry; and
  setting a RID value of each of the row pointers of every index entry to the RID of each corresponding row in the sub-tables of the index entry.

7. A computer program product comprising:
  a non-transitory computer readable storage medium having computer readable program code embodied therewith, the computer readable program code comprising:
  computer readable program code configured for:
    selecting a table of a relational database;
    splitting the selected table by column into sub-tables, wherein at least one of the sub-tables includes at least two columns; and
    writing each of the sub-tables into corresponding tables of a row-based storage database, the writing including:
      specifying one of the sub-tables as a base sub-table;
      creating a row identifier (RID) for each row in the base sub-table;
      adding the RIDs to each row of the base sub-table; and
      adding the RIDs to each corresponding row of each of the sub-tables.

8. The computer program product of claim 7, wherein the splitting comprises:
  selecting one column in the table; and
  grouping the selected column together with other columns from the table according to a frequency that the selected column and the other columns are jointly accessed.

9. The computer program product of claim 7, wherein the computer readable program code is further configured for:
  indexing each of the sub-tables of the row-based storage database by using one of:
  a B+ tree structure; and
  a hash index;
  assigning a row pointer corresponding to each row of the sub-tables to each leaf index entry; and
  setting a RID value of each of the row pointers of every index entry to the RID of each corresponding row in the sub-tables of the index entry.

* * * * *